May 2, 1933. J. ANDERSON 1,907,171
CLUTCHES FOR CONTROLLING MOTORS
Filed Aug. 31, 1931

INVENTOR
John Anderson
BY
ATTORNEY

Patented May 2, 1933

1,907,171

UNITED STATES PATENT OFFICE

JOHN ANDERSON, OF NEW YORK, N. Y.

CLUTCHES FOR CONTROLLING MOTORS

Application filed August 31, 1931. Serial No. 560,282.

This invention relates to new and useful improvements in clutches for controlling motors.

The invention has for an object the construction of a device which is characterized by a plurality of individual means capable of rotations for the purpose of transmitting power, particularly for winding a spring motor, in which the shafts are in line with each other and in which means is provided for coupling the shafts together as is desired for obtaining proper driving.

A still further object of this invention is the provision of a resilient connection between the couplings mentioned in the previous paragraph, and compressed air means for controlling the engaging and disengaging of the couplings.

A still further object of this invention is the construction of a device of the class mentioned which is of simple, durable construction, dependable in use and efficient in operation and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Figure 1:
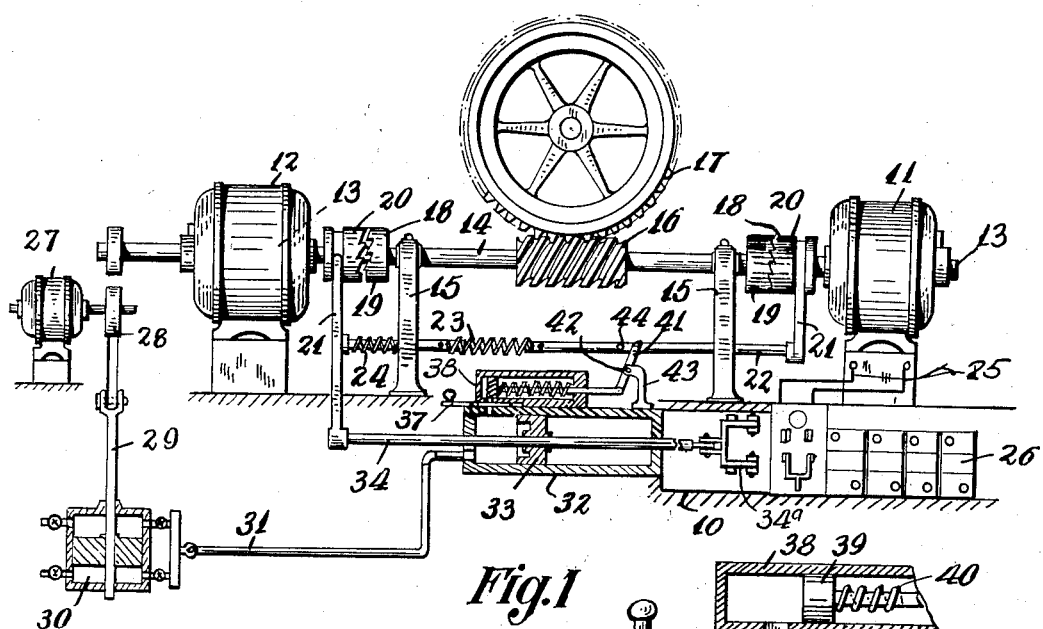
Fig. 1 is an elevational view of a device constructed according to this invention, portions thereof being shown in section to illustrate interior parts.

The device shown in Fig. 1, comprises a base 10 upon which a plurality of individual driving means 11 and 12 have been mounted. These driving means are in the form of electric motors having their shafts 13 in line with each other. A driven shaft 14 is shown rotatively supported on standards 15 and also in line with the shafts. A worm pinion 16 is mounted on the shaft 14 and meshes with a worm wheel 17 which may be connected for winding the spring of a spring motor. While the invention is particularly intended for this purpose, this is no limitation since the gear 17 and the motors may be connected for other rotating purposes such as driving an automobile, an airplane, a locomotive, a ship, etc.

Couplings 18 are mounted upon shafts 13 and on the shaft 14 for the purpose of connecting these parts together. Each of these couplings comprises a stationary jaw 19 fixed upon the ends of the shaft 14 and engageable with movable jaws 20 slidably mounted on the shafts 13. The movable jaws have peripheral grooves engaged by forked arms 21. A member 22 connects the arms 21 and is composed of two sections fairly firmly connected together by a resilient member 23 which is shown as a stiff spring. Another spring 24 is co-axial on the member 22 and acts between one of the standards 15 and one of the members 21 for normally urging the member 22 in one direction so that one of the clutches 18 is closed or engaged while the other is open. Thus, the rotations from the motor 11 may be transmitted to the gear 17. Wires 25 are shown connected with a nest of batteries 26 for the purpose of driving the motor 11.

A motor 27 is provided with an eccentric 28 connected with the piston rod 29 of an air compressor 30. This air compressor upon operation is capable of discharging compressed air through the line 31 into a compressed air tank 32. This tank is provided with a piston 33 having a piston rod 34 connected with one of the arms 21 by reason of being connected with one section of member 22. At the front end of the cylinder 32 there are exhaust passages 35 and 36. A valve 37 is slidably mounted over these passages and controls the exhaust of the compressed air from the cylinder 32 either to the atmosphere if set to coact with the passage 35 or into an auxiliary cylinder 38 if set to co-operate with the passage 36. This auxiliary cylinder is provided with a piston 39 urged inwards by an expansion spring 40. The piston is connected with a lever 41 pivotally mounted intermediately at 42 upon a standard 43. The top end of the lever 41 is capable of abutting against a pin 44 projecting from the member 22. A switch 34ª connects with the rod 34 for automatic operation to open and close a circuit for any purpose, not shown on the drawing, according to the position of the rod.

The operation of the device consists in setting the valve 37, for example, so as to cause the air in the tank 32 to the front of the piston 33 to pass into the auxiliary cylinder 38. Then, upon operation of the motor 27, compressed air will cause the piston 33 to move so as to engage the clutch between the device 12 and the shaft 14. Normally, this would tend to move the member 22 so that the clutch between the device 11 and the shaft 14 would be disengaged, but the moving of the piston 39 causes the lever 41 to act against the pin 44 and compress the spring 23 so as to maintain engagement of the clutch between the device 11 and the shaft 14. Then both the motors 11 and 12 drive the gear 17.

Figure 2:
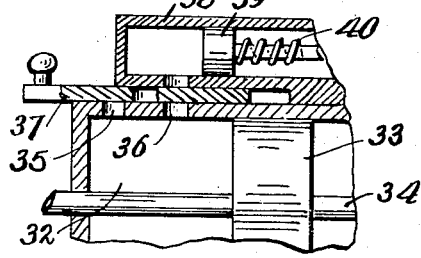
Fig. 2 is a fragmentary enlarged sectional view of the valve for controlling the air which operates the clutches.

If it is so desired, the valve 37 could have been set, as shown in Fig. 2, that is with neither of the openings 36 nor 35 discharging. Then, upon the passage of the compressed air into the cylinder 32, one of the clutches will be closed while the one which is now closed will be open. When the valve is set so that the passage 35 discharges, the device is again placed into its original condition with one of the clutches closed as shown in Fig. 1.

Figure 3:
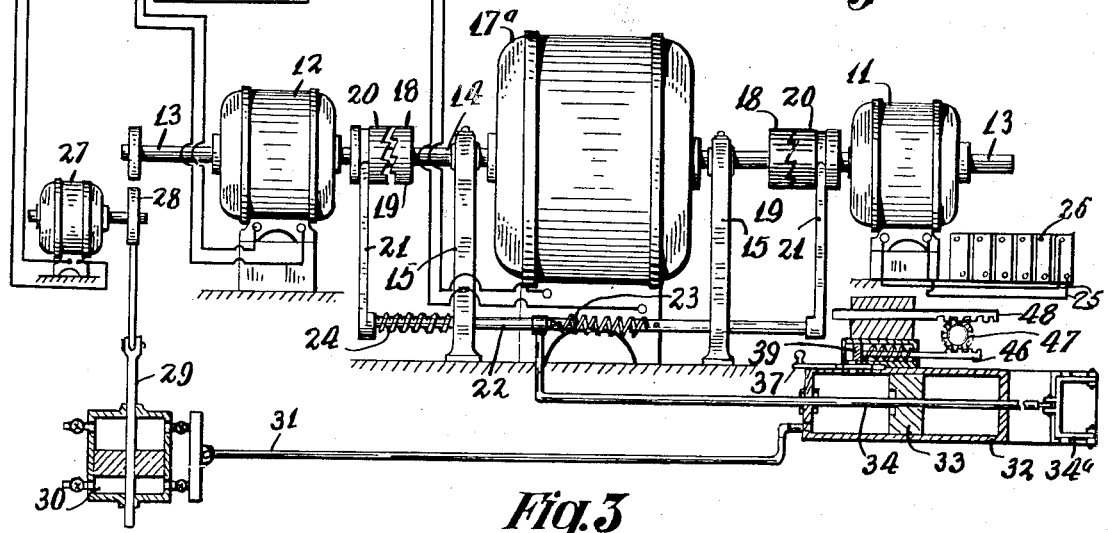
Fig. 3 is a view similar to Fig. 1 but illustrating a modified arrangement.

In Fig. 3 a modification of the invention has been disclosed in which the shaft 14 is that of a generator 17ª. The other drives 11 and 12 are similar to those described in the preferred form. Other parts may be recognized by corresponding reference numerals. A control panel 45 is provided with necessary switches to control the operation of the electrical mechanism. The device further distinguishes in that the piston rod from the piston 39 is formed with rack teeth 46 which mesh with the rack pinion 47, in turn meshing with a rack 48 slidably mounted and capable of engaging against the member 21 for the same purpose that the lever 41 engages against the pin 44 in the preferred form, that is so as to hold one of the clutches closed while the other one is being closed.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A device of the class described, comprising a plurality of individual means having shafts in line with each other, couplings on said shafts for connecting the individual means together, a member between said couplings for controlling their operations and composed of sections resiliently connected, compressed air means for moving one of said sections, an auxiliary cylinder connected with the compressed air system, a valve controlling the passage of air to the auxiliary cylinder, a piston and rod in said auxiliary cylinder, and means for rigidly holding the other section of said member when said valve is in condition for operating the piston of the auxiliary cylinder.

2. A device of the class described, comprising a plurality of individual means having shafts in line with each other, couplings on said shafts for connecting the individual means together, a member between said couplings for controlling their operations and composed of sections resiliently connected, compressed air means for moving one of said sections, an auxiliary cylinder connected with the compressed air system, a valve controlling the passage of air to the auxiliary cylinder, a piston and rod in said auxiliary cylinder, and means for rigidly holding the other section of said member when said valve is in condition for operating the piston of the auxiliary cylinder, said individual means comprising motors.

3. A device of the class described, comprising a plurality of individual means having shafts in line with each other, couplings on said shafts for connecting the individual means together, a member between said couplings for controlling their operations and composed of sections resiliently connected, compressed air means for moving one of said sections, and auxiliary cylinder connected with the compressed air system, a valve controlling the passage of air to the auxiliary cylinder, a piston and rod in said auxiliary cylinder, and means for rigidly holding the other section of said member when said valve is in condition for operating the piston of the auxiliary cylinder, each of said couplings being provided with a stationary jaw and a movable jaw co-actable therewith.

4. A device of the class described, comprising a plurality of individual means having shafts in line with each other, couplings on said shafts for connecting the individual means together, a member between said couplings for controlling their operations and composed of sections resiliently connected, compressed air means for moving one of said sections, an auxiliary cylinder connected with the compressed air system, a valve controlling the passage of air to the auxiliary cylinder, a piston and rod in said auxiliary cylinder, and means for rigidly holding the other section of said member when said valve is in condition for operating the piston of the auxiliary cylinder, each of said couplings being provided with a stationary jaw and a movable jaw coactable therewith, said movable jaw being connected with said member for the operation of said jaws.

5. A device of the class described, comprising a plurality of individual means having shafts in line with each other, couplings on said shafts for connecting the individual means together, a member between said couplings for controlling their operations and composed of sections resiliently connected, compressed air means for moving one of said sections, an auxiliary cylinder connected with the compressed air system, a valve controlling the passage of air to the auxiliary cylinder, a piston and rod in said auxiliary cylinder, and means for rigidly holding the other section of said member when said valve is in condition for operating the piston of the auxiliary cylinder, said valve being capable of discharging air from the system into the atmosphere.

6. A device of the class described, comprising a plurality of individual means having shafts in line with each other, couplings on said shafts for connecting the individual means together, a member between said couplings for controlling their operations and composed of sections resiliently connected, compressed air means for moving one of said sections, an auxiliary cylinder connected with the compressed air system, a valve controlling the passage of air to the auxiliary cylinder, a piston and rod in said auxiliary cylinder, and means for rigidly holding the other section of said member when said valve is in condition for operating the piston of the auxiliary cylinder, comprising a pin projecting from the other section of said member, and a pivoted lever connected with the piston rod and engageable against the pin of the other section of said member.

7. A device of the class described, comprising a plurality of individual means having shafts in line with each other, couplings on said shafts for connecting the individual means together, a member between said couplings for controlling their operations and composed of sections resiliently connected, compressed air means for moving one of said sections, an auxiliary cylinder connected with the compressed air system, a valve controlling the passage of air to the auxiliary cylinder, a piston and rod in said auxiliary cylinder, and means for rigidly holding the other section of said member when said valve is in condition for operating the piston of the auxiliary cylinder, comprising rack teeth formed on said piston rod, a pinion meshing with said rack teeth, and a slidable rack meshing with said pinion and engageable against the other section of said member.

In testimony whereof I have affixed my signature.

JOHN ANDERSON.